United States Patent
Ostermeier et al.

(10) Patent No.: US 8,672,022 B2
(45) Date of Patent: Mar. 18, 2014

(54) METHOD FOR PRE-CLIMATIZING A STOPPED MOTOR VEHICLE

(75) Inventors: Ralph Ostermeier, Wolfersdorf (DE); Peter Satzger, Landsberg am Lech (DE); Georg Gerstenbrandt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 794 days.

(21) Appl. No.: 12/558,998

(22) Filed: Sep. 14, 2009

(65) Prior Publication Data

US 2010/0222929 A1    Sep. 2, 2010

Related U.S. Application Data

(63) Continuation of application No. PCT/EP2008/001801, filed on Mar. 6, 2008.

(30) Foreign Application Priority Data

Mar. 15, 2007  (DE) .......................... 10 2007 012 421

(51) Int. Cl.
*B60H 1/00* (2006.01)
*F25B 29/00* (2006.01)

(52) U.S. Cl.
USPC ............. 165/202; 165/266; 165/271; 62/133; 62/134; 62/159; 62/230; 62/243; 62/244; 700/276

(58) Field of Classification Search
USPC ......... 165/202, 266, 271; 62/3.1–3.3, 3.7, 89, 62/133, 134, 159, 230, 243, 244, 62/410–412; 700/276
See application file for complete search history.

(56) References Cited

U.S. PATENT DOCUMENTS

| | | | |
|---|---|---|---|
| 5,348,225 A * | 9/1994 | Hwang | 236/51 |
| 5,361,593 A | 11/1994 | Dauvergne | |
| 6,158,225 A | 12/2000 | Muto et al. | |
| 6,745,582 B1 * | 6/2004 | Urbank et al. | 62/133 |
| 6,889,762 B2 * | 5/2005 | Zeigler et al. | 165/240 |
| 7,013,656 B2 | 3/2006 | Yanagimachi et al. | |
| 7,055,340 B2 | 6/2006 | Umebayashi et al. | |

(Continued)

FOREIGN PATENT DOCUMENTS

| | | |
|---|---|---|
| DE | 197 31 071 A1 | 1/1999 |
| DE | 198 48 966 A1 | 6/1999 |

(Continued)

OTHER PUBLICATIONS

German Search Report dated Jul. 23, 2007 including partial English translation (Nine (9) pages).

(Continued)

*Primary Examiner* — Ljiljana Ciric
(74) *Attorney, Agent, or Firm* — Crowell & Moring LLP

(57) ABSTRACT

A method and a correspondingly designed motor vehicle are provided for pre-climatizing the motor vehicle when shut-off by way of a heating and/or cooling unit, which draws its energy for heating and/or cooling from an electric storage unit. When the heating and/or cooling unit is activated by a vehicle external operator control element, the heating and/or cooling unit is initially activated in a first output stage. Then, the heating and/or cooling unit is switched from the first output stage to a second output stage as a function of predetermined conditions.

14 Claims, 1 Drawing Sheet

(56) References Cited

U.S. PATENT DOCUMENTS

| | | | |
|---|---|---|---|
| 7,621,136 B2* | 11/2009 | Kim | 62/3.3 |
| 2002/0157414 A1* | 10/2002 | Iwanami et al. | 62/239 |
| 2004/0069482 A1* | 4/2004 | Yoshinori et al. | 165/202 |
| 2004/0194479 A1 | 10/2004 | Umebayashi et al. | |
| 2006/0075766 A1* | 4/2006 | Ziehr et al. | 62/186 |
| 2012/0240882 A1* | 9/2012 | Gao et al. | 123/41.55 |

FOREIGN PATENT DOCUMENTS

| | | |
|---|---|---|
| DE | 199 60 562 C1 | 12/2000 |
| DE | 102 41 587 A1 | 4/2004 |
| DE | 103 26 596 A1 | 11/2004 |
| DE | 10 2004 016 691 A1 | 12/2004 |
| DE | 10 2005 004 950 A1 | 8/2006 |
| FR | 2 818 197 A1 | 6/2002 |
| WO | WO 2007/023340 A1 | 3/2007 |
| WO | WO 2008/110298 A1 | 9/2008 |

OTHER PUBLICATIONS

International Search Report dated Jun. 16, 2008 including English translation (Six (6) pages).

European Office Action dated Dec. 23, 2009 including English translation (Seven (7) pages).

Chinese Office Action dated Mar. 17, 2011 including English-language translation (Eleven (11) pages).

\* cited by examiner

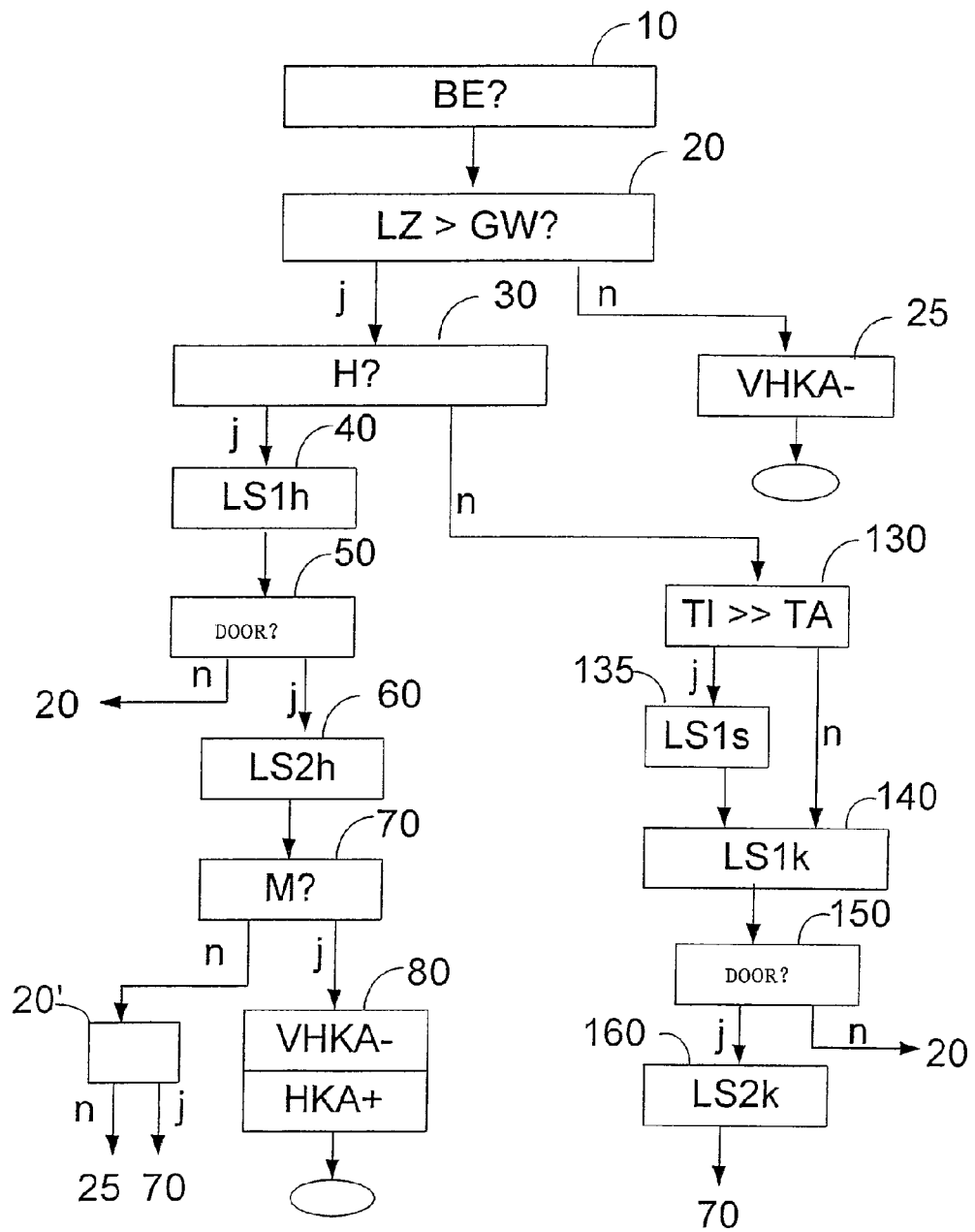

METHOD FOR PRE-CLIMATIZING A STOPPED MOTOR VEHICLE

CROSS-REFERENCE TO RELATED APPLICATIONS

This application is a continuation of PCT International Application No. PCT/EP2008/001801, filed Mar. 6, 2008, which claims priority under 35 U.S.C. §119 to German Patent Application No. DE 10 2007 012 421.1, filed Mar. 15, 2007, the entire disclosures of which are herein expressly incorporated by reference.

BACKGROUND AND SUMMARY OF THE INVENTION

The invention relates to a method for pre-climatizing a stopped motor vehicle by way of a heating and/or cooling unit, which draws its energy for heating and/or cooling from an electric storage unit, as well as to a corresponding motor vehicle with a heating and/or cooling unit for carrying out the method.

In order to be able to optimally control the temperature of a stopped motor vehicle, there exist currently a variety of devices and methods. DE 197 31 071 A1 discloses a system, which is intended for controlling the temperature of the interior of a stopped motor vehicle. In this case, the method utilizes the residual heat that is still present in the vehicle and which comes from a heat source, as well as the residual coldness that is still present in the vehicle and which comes from a refrigeration source.

Since the utilization of residual heat and/or residual coldness is possible only if the heat sources and/or the refrigeration sources that are used to this end are in a state, in which they can dissipate heat and/or coldness—therefore, as a rule, immediately following a (prolonged) operation of the motor vehicle—such systems are often not sufficient to facilitate an optimal temperature control of the interior of a stopped motor vehicle.

In addition to the afore-mentioned devices for controlling the temperature of the interior of a stopped vehicle, supplementary heating units, auxiliary heating units and/or electrically driven cooling units, which usually obtain their energy with the aid of internal combustion engines or thermal energy storage units, are often used for heating or cooling the vehicle when in a stopped mode. Such heating and/or cooling units have an enormous fuel consumption and are, therefore, associated with the emission of an undesirably high quantity of pollutants.

New vehicle concepts, in particular hybrid vehicles, suggest an approach that utilizes the necessary energy for operating the heating and/or cooling units in the stopped state from the existing electric energy accumulators. Thus, DE 10 2005 004 950 A1 discloses an air conditioning system for a hybrid vehicle. In this case, air preconditioning is made possible by an electric refrigerant compressor, which is already mass produced and present in the system and which is activated by a traction battery of the vehicle. Even though such systems have the advantage that air preconditioning is possible without the emissions from an internal combustion engine or a fuel fired heating unit, the air preconditioning is possible only for a limited period of time owing to the storage capacity of the electric accumulators. As soon as the charge state is, or falls, below a predetermined limit value, an air preconditioning is not possible (any longer), since otherwise the operation of the motor vehicle could be put at risk. The result would be an enormous loss in comfort and convenience for the driver.

The object of the invention is to provide a method and a device for pre-climatizing a stopped motor vehicle without the emission of pollutants. In this context, air preconditioning can be guaranteed for the longest possible time and/or the useful period for the customer.

This object is achieved by a method, and correspondingly equipped motor vehicle, for pre-climatizing a stopped (shut-off) motor vehicle by way of a heating and/or cooling unit, which draws its energy for heating and/or cooling from an electric storage unit. When the heating and/or cooling unit is activated by a vehicle external operator control element, the heating and/or cooling unit can be operated in at least two output stages. When the heating and/or cooling unit is activated in the stationary state, the heating and/or cooling unit is activated in a first output stage, and the heating and/or cooling unit is switched from the first output stage into a second output stage as a function of the predetermined conditions. Advantageous further developments are described herein.

According to an aspect of the invention, energy for pre-climatizing the interior of the vehicle is taken from the electric storage unit. Furthermore, it is assumed that in the event that the driver wants air preconditioning in the interior of the vehicle, the driver will activate the heating and/or cooling units that are present for this purpose prior to the actual use of the vehicle. As soon as the driver opens the interior of the vehicle, he would like the warm or cold air to stream towards him.

The inventive method for air preconditioning a stopped (shut-off) motor vehicle by way of a heating and/or cooling unit, which draws its energy for heating and/or cooling from an electric storage unit, is characterized in that the heating and/or cooling unit can be operated in at least two output stages. When the heating and/or cooling unit is activated by means of a vehicle external operator control element, the heating and/or cooling unit is activated initially in a first output stage. If the predetermined conditions are fulfilled, the heating and/or cooling unit is switched into a second output stage, where the second output stage generates a higher heating or cooling output than the first output stage.

The inventive method and/or the correspondingly designed motor vehicle offer(s) the advantage that only a small amount of energy is consumed initially, and not until later when a switch is made to the second output stage, is more energy then consumed. In this way, the period of time for air preconditioning (climatizing) can be extended.

This method is especially beneficial for motor vehicles which are equipped with a hybrid engine system. In this case, a system for driving the wheels is designed as an electric motor, which draws its energy from an electric storage unit. This electric storage unit is also used for heating or cooling the interior of a stopped vehicle.

The activation of the air preconditioning process by way of the vehicle external operator control element can occur in a number of different ways. The operator control element can be integrated into a separate remote control unit or in its key unit. In this case, both a joint and separate operator control element for starting a heating process and/or for starting a cooling process can be provided.

The first output stage can be designed in a variety of different ways. In a first alternative, the first output stage is designed such that only a flushing process of the interior of the vehicle is initiated. That is, the air in the interior of the vehicle is blown out of the interior of the vehicle. This output stage offers itself, for example, when the interior of the vehicle is hot, and the driver wants cooling. Since this output stage needs just a very small amount of energy, this embodiment of the output stage is advantageous when the charge state or the capacity of the electric storage unit (accumulator) is very low, since in this case no active cooling of the interior of the vehicle occurs.

In a second alternative, the first output stage can be designed such that in a first step a flushing process of the interior of the vehicle is initiated, and then in a second step the heating and/or cooling unit is operated at low or average capacity. This embodiment of the first output stage is particularly beneficial when the air in the interior of the vehicle is hot and the driver wants a cool vehicle interior, and the charge state of the electric storage unit is sufficient to facilitate an active cooling of the interior of the vehicle at low or average capacity.

In a third alternative, the first output stage can be designed such that without the previous flushing of the interior of the vehicle, the heating and/or cooling unit is run at low or average capacity. Such an embodiment of the first output stage is particularly beneficial when the charge state of the electric storage unit is adequately high, and flushing the interior of the vehicle would not yield any improvement with respect to heating or cooling the interior of a stopped vehicle.

Depending on whether only one or several of the aforementioned first output stages can be carried out by the heating or cooling unit, the heating and/or cooling unit (or rather its control unit) automatically selects, on activation of the heating and/or cooling unit in the stopped state, the corresponding first output stage as a function of the selected type of temperature control, the temperature in the interior of the vehicle, and/or the outside temperature and/or the charge state of the electric accumulator.

It is advantageous in the case of a first output stage, which implements exclusively a flushing process of the interior of the vehicle, to design the second output stage in such a manner that the heating and/or cooling unit is run at low or average capacity and/or in such a manner that the heating and/or cooling unit is run at high capacity. If both embodiments of the second output stage can be carried out by the heating or cooling unit, then the heating and/or cooling unit, or rather its control unit, ideally selects the second output stage as a function of the charge state of the electric storage unit. If the charge state is very low, then the output stage, in which the heating and/or cooling unit is run only at average capacity, is selected as the second output stage. Thus, a very high discharging of the electric storage unit and an associated shutting-off of the heating and/or cooling unit, in the event that the charge state falls to a predetermined lowest limit, is prevented.

In a first output stage, in which the heating and/or cooling unit is run at low or average capacity, the second output stage can be designed such that the heating and/or cooling unit is run at high capacity. This embodiment is possible only if the charge state of the electric storage unit is adequate for the air preconditioning at high capacity for a predetermined period of time.

An additional aspect of the invention consists of specifying a suitable change-over time from the first output stage to the second output stage. The change-over time should be selected in such a way that, as soon as the driver gets into the vehicle, he has the feeling that his request for air preconditioning is being considered. To this end, an advantageous embodiment of the invention provides, therefore, that a switch is made from the first output stage to the second output stage, when the luggage compartment or a vehicle door, preferably the driver's vehicle door, is unlocked or opened. Depending on the configuration of the unlocking system of the motor vehicle, the vehicle is unlocked when the driver activates a corresponding operator control element of a remote control unit, when he and/or a remote control unit is (are) detected inside a predefined region around the vehicle, or when he unlocks the vehicle manually with a key at the lock of a door or the luggage compartment. Whether an activation process of the second output stage ensues upon unlocking the vehicle or upon opening a vehicle door, such as the driver's vehicle door, can be permanently predefined or can ensue as a function of the charge state of the electric accumulator. In this context, when the charge state is low, the switch-over process from the first output stage to the second output stage should not take place until as late as possible, preferably not until the driver's door of the motor vehicle is opened.

If the inventive method is implemented in a vehicle of the type, in which the energy to start the motor vehicle is drawn from the same electric storage unit, then it is especially important to monitor the charge state of the electric storage unit. In one advantageous embodiment of the method according to the invention, the heating and/or cooling unit should not be activated or deactivated in the case of a charge state of the electric storage unit that is or falls below a predetermined limit value so that the start-up process remains guaranteed.

Other objects, advantages and novel features of the present invention will become apparent from the following detailed description of one or more preferred embodiments when considered in conjunction with the accompanying drawing.

BRIEF DESCRIPTION OF THE DRAWING

The sole FIGURE shows a simplified flow chart as an example of the inventive method for pre-climatizing (air pre-conditioning) a stopped motor vehicle by way of a heating and cooling unit.

DETAILED DESCRIPTION OF THE DRAWING

It is assumed that the heating and air conditioning unit draws its energy for pre-climatizing (air preconditioning) the interior of the vehicle from an electric storage unit, which is used at the same time to start up the motor vehicle and to some extent also for an electric motor. The method is implemented as a routine in a control unit for controlling and/or regulating a climate control system, in particular a heating and air conditioning unit.

The method for air preconditioning a stopped motor vehicle is started in step 10, when the driver activates by way of a vehicle external operator control element BE the heating and air conditioning unit for air preconditioning his stopped vehicle. The operator control element can be integrated into a separate remote control unit or in his key unit. In this case, a joint or separate operator control element for starting a heating process and/or for starting a cooling process can be provided. For the sake of simplicity, the following discussion refers only to an operator control element BE.

After the driver has expressed his request for air preconditioning by activating the operator control element BE, step 20 checks whether the charge state LZ of the electric storage unit, which is used for air preconditioning, has exceeded a predetermined limit value GW. In this case, the limit value GW is predetermined in such a manner that activating the heating and air conditioning unit VHKA does not result in a negative impact on the start-up process of the vehicle. If the charge state LZ of the electric storage unit falls below the predetermined limit value GW, then one proceeds to step 25. The heating and air conditioning unit VHKA is not activated, and/or in the event that it was already activated beforehand, it is deactivated in step 25. The process or rather the routine is terminated.

If the charge state LZ of the electric storage unit exceeds the limit value GW, then step 30 checks whether the driver wants heating H or cooling of the interior of the vehicle. This request can be determined, for example, by checking whether the driver has activated the operator control element BE for heating or has activated the operator control element BE for cooling.

If the driver wants heating H of the interior of the vehicle, then step 40 activates a first heating output stage LS1*h* of the heating and air conditioning unit VHKA. This first heating output stage LS1*h* is configured such that the heating and air conditioning unit VHKA heats at average capacity the interior of the vehicle. After the first heating output stage LS1*h* has been activated, in the next step 50 it is queried whether the driver's door DOOR is opened. As long as the driver's door is not open, the routine always jumps back again to step 20. In this way, the charge state LZ of the electric storage unit is continuously queried so that the air preconditioning process can be optionally interrupted in the event that the charge state LZ falls below the limit value GW. If the charge state LZ is sufficient, the interior of the vehicle is heated by the heating and air conditioning unit VHKA, which is activated in the first heating output stage LS1*h*.

As soon as step 50 detects that the driver's door DOOR of the vehicle is opened, one proceeds to step 60, where a second heating output stage LS2*h* of the heating and air conditioning unit VHKA is activated. This second heating output stage LS2*h* is designed such that at this stage the heating and air conditioning unit VHKA heats up at high capacity the interior of the vehicle. After the second heating output stage LS2*h* has been activated, the next step 70 queries whether the vehicle, in particular the engine M, was started. As long as the engine M has not been started, the routine jumps to step 20', which initiates, analogous to step 20, a check of the charge state LZ of the electric storage unit. If the charge capacity is no longer adequate—thus, if the charge state LZ falls below the predetermined limit value GW—then the routine jumps to step 25, where the air preconditioning process is deactivated, and then the routine is terminated. If the charge capacity is sufficient—thus, if the charge state LZ exceeds the predetermined limit value GW—then the routine jumps again to step 70, and the air preconditioning process is maintained with the second heating output stage LS2*h*. As soon as the engine M is started, the routine jumps from step 70 to step 80, where the air preconditioning process VHKA is terminated, and the conventional air conditioning process HKA is activated.

If the driver does not want heating H of the interior of the vehicle, but rather cooling, step 130 checks the temperature in the interior of the vehicle T1. If the temperature in the interior of the vehicle T1 is very much higher than the outside temperature TA, step 135 activates a first precooling output stage LS1*s*, which initiates a flushing process of the interior of the vehicle. After the flushing process, step 140 activates the actual first cooling output stage LS1*k*. This first cooling output stage LS1*k* is designed in such a manner that the heating and air conditioning unit VHKA cools with average capacity the interior of the vehicle.

If the temperature in the interior of the vehicle T1 is not very much higher than the outside temperature TA, the routine jumps from step 130 immediately to step 140, (without carrying out a flushing process LS is of the interior of the vehicle) and activates immediately the first cooling output stage LS1*k*.

After the first cooling output stage LS1*k* has been activated, in the next step 150 it is queried whether the driver's door DOOR is opened. As long as the driver's door DOOR is not opened, the routine always jumps back again to step 20. In this way, the charge state LZ of the electric storage unit is continuously queried so that the air preconditioning process can be optionally interrupted in the event that the charge state LZ falls below the limit value GW. If the charge state LZ is sufficient, then the interior of the vehicle continues to be cooled by the heating and air conditioning unit VHKA, which is activated in the first cooling output stage LS1*s*.

As soon as step 150 detects that the driver's door DOOR of the vehicle is opened, one proceeds to step 160, where a second cooling output stage LS2*k* of the heating and air conditioning unit VHKA is activated. This second cooling output stage LS2*k* is designed in such a manner that at this stage the heating and air conditioning unit VHKA cools at high capacity the interior of the vehicle. After the second cooling output stage LS2*k* has been activated, the routine jumps to step 70, and the routine continues and/or is terminated, as already described above. In this way, optimal cooling of the interior of the vehicle is guaranteed while at the same time the interior of the vehicle is considered.

The above described method is only intended to be a highly simplified example. Of course, still other system parameters can be queried, and as a result thereof, the necessary system intervention can be initiated. This operating strategy can also be coupled with other strategies—for example, with ventilation strategies by way of lowering the windows and/or with strategies for cooling the battery in the stopped state—but in all cases attention must always be paid to the charge state of the electric storage unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for pre-climatizing a stopped motor vehicle using a heating and/or cooling unit, which draws energy for heating and/or cooling from an electric storage unit, the method comprising the acts of:
   operating the heating and/or cooling unit in at least two output stages, wherein
   (i) when the heating and/or cooling unit is activated by a vehicle external operator control element in a stopped state of the motor vehicle, using a first output stage, wherein when each of a charge state of the electric storage unit is above a predetermined level and when an outside temperature is much less than an interior temperature of the vehicle, the first stage comprises performing both, in a first step, a flushing process of the interior of the vehicle and, in a second step, operating the heating and/or cooling unit at a first capacity; and
   (ii) switching the heating and/or cooling unit from the first output stage into a second output stage as a function of predetermined conditions, where the second output stage comprises operating the heating and/or cooling unit at a second capacity which is higher than the first capacity.

2. The method according to claim 1, wherein the first output stage comprises:

(a) only performing the flushing process of an interior of the vehicle when the charge state of the electric storage unit is below the predetermined level; and (b) wherein when the charge state of the electric storage unit is above the predetermined level but the outside temperature is not much less than the interior temperature of the vehicle by at least the predetermined amount, the first stage comprises only running the heating and/or cooling unit at the first capacity.

3. The method according to claim 1, wherein the first capacity is at or below the average capacity, and the second capacity is a high capacity.

4. The method according to claim 1, wherein the switching from the first output stage to the second output stage occurs when a vehicle door is unlocked or opened.

5. The method according to claim 4, further comprising the act of not activating or deactivating the heating and/or cooling unit when a charge state of the electric storage unit falls below a predetermined minimum value.

6. The method according to claim 4, wherein the vehicle door is a driver door.

7. The method according to claim 1, further comprising the act of not activating or deactivating the heating and/or cooling unit when a charge state of the electric storage unit falls below a predetermined minimum value.

8. The method of claim 1 further comprising:
determining, periodically, if a vehicle door is unlocked or opened; and
determining, in the event the vehicle door is determined to not be unlocked or opened, if a charge level of the electric storage unit is below a predetermined minimum level; and
deactivating the heating and/or cooling unit if it is determined that the charge state of the electric storage unit is below the predetermined minimum value.

9. A motor vehicle, comprising:
a heating and/or cooling unit for pre-climatizing the motor vehicle when stopped, the heating and/or cooling unit drawing energy from an electric storage unit of the motor vehicle;
a vehicle external operator control element for activating the heating and/or cooling unit; and
wherein the heating and/or cooling unit is operable in at least two output stages, the heating and/or cooling unit being activated in the stopped state in a first output stage and being switchable from the first output stage into a second output stage as a function of predetermined conditions,
wherein, when each of a charge state of the electric storage unit is above a predetermined level and when an outside temperature is much less than an interior temperature of the vehicle, the first stage comprises performing both, in a first step, a flushing process of the interior of the vehicle and, in a second step, operating the heating and/or cooling unit at a first capacity, and
wherein the second output stage comprises operating the heating and/or cooling unit at a second capacity which is higher than the first capacity.

10. The motor vehicle according to claim 9, wherein the first output stage comprises:
(a) only performing the flushing process of an interior of the vehicle when the charge state of the electric storage unit is below the predetermined level;
(b) wherein when the charge state of the electric storage unit is above the predetermined level but the outside temperature is not much less than the interior temperature of the vehicle by at least the predetermined amount, the first stage comprises only running the heating and/or cooling unit at or below an average capacity.

11. The motor vehicle according to claim 9, wherein the first capacity is at or below the average capacity, and the second capacity is a high capacity.

12. The motor vehicle according to claim 9, wherein the switching from the first output stage to the second output stage occurs when a vehicle door is unlocked or opened.

13. The motor vehicle according to claim 12, wherein the vehicle door is a driver door.

14. The motor vehicle of claim 9 wherein the heating and/or cooling unit is deactivated if it is determined, in accordance with periodic checking, that a vehicle door has not been unlocked or opened and that a charge state of the electric storage unit is below a predetermined minimum value.

* * * * *